(12) United States Patent
Vertes

(10) Patent No.: US 7,039,718 B2
(45) Date of Patent: May 2, 2006

(54) MULTIPROCESS COMPUTER SYSTEM

(75) Inventor: Marc Vertes, Chevreuse (FR)

(73) Assignee: Airsys ATM S.A., Bagneux (FR)

( * ) Notice: Subject to any disclaimer, the term of this patent is extended or adjusted under 35 U.S.C. 154(b) by 782 days.

(21) Appl. No.: 09/943,518

(22) Filed: Aug. 31, 2001

(65) Prior Publication Data

US 2002/0062389 A1 May 23, 2002

(30) Foreign Application Priority Data

Sep. 1, 2000 (FR) .................................. 00 11197

(51) Int. Cl.
*G06F 15/173* (2006.01)

(52) U.S. Cl. ........................ 709/238; 709/204; 712/238; 713/168

(58) Field of Classification Search ................ 709/203, 709/227, 249, 204, 238, 224, 236, 250; 711/110; 370/392; 712/208
See application file for complete search history.

(56) References Cited

U.S. PATENT DOCUMENTS

| 5,243,607 | A | | 9/1993 | Masson et al. | |
| 5,257,369 | A | | 10/1993 | Skeen et al. | |
| 5,802,293 | A | | 9/1998 | Van Der Sijpt | |
| 6,199,101 | B1 | * | 3/2001 | Pfaff | 709/204 |
| 6,298,370 | B1 | * | 10/2001 | Tang et al. | 718/102 |
| 6,625,689 | B1 | * | 9/2003 | Narad et al. | 711/110 |

OTHER PUBLICATIONS

Michael B. Jones, "Interposition Agents: Transparently Interposing User Code at the System Interface," Operating Systems Review (SIGOPS), vol. 27, No. 5, Dec. 1, 1993, pp. 80-93 (XP000418685).
Karim R. Mazouni, "Étude de L'Invocation Entre Objets Dupliqués dans un Systéme Réparti Tolérant aux Fautes," Thése N. 1578—École Polytechnique Fédérale De Lausanne, Jan. 1996, pp. i-iv, ix-xii, 53-120 (XP002167871).

* cited by examiner

*Primary Examiner*—Jeffrey Pwu
(74) *Attorney, Agent, or Firm*—Oblon, Spivak, McClelland, Maier & Neustadt, P.C.

(57) ABSTRACT

A multiprocess computer system comprises at least two processes (P1, P2, . . . Pi, . . . PN) connected by a network. Each process is executed by a piece of hardware equipped with an operating system. A process comprises at least a library software layer by which this operating system can access the programs for the activation of the communications protocols associated with the inputs/outputs; an intermediate layer comprising an inter-process communications process associated with a communications channel; a multiplexer encapsulated in the library multiplexing the communications channel of a process Pi with the communications channels of the other processes P1, P2, . . . PN, the communications channel between two processes Pi, Pk being activated by the multiplexers of the two processes, upon a request by one of them. It can be used especially for extensive communications among various computer processes through standard inputs/outputs. More particularly, it can be used for the applications-transparent implementation of complex services such as services pertaining to client/server mode, distributed and concurrent processing, data flow control, malfunction tolerance, supervision, reconfiguration and dynamic extension as well as the modeling of the systems architecture.

11 Claims, 3 Drawing Sheets

MULTIPROCESS COMPUTER SYSTEM

BACKGROUND OF THE INVENTION

The present invention relates to a multiprocess computer system. It can be used especially for extensive communications among various computer processes through standard inputs/outputs. More particularly, it can be used for the applications-transparent implementation of complex services such as, for example, services pertaining to client/server mode, distributed and concurrent processing, data flow control, malfunction tolerance, supervision, reconfiguration and dynamic extension as well as the modelling of the systems architecture.

The communications channels of UNIX machines, also known as UNIX pipes, constitute especially an inter-process communications service providing for the one-way, secured transfer of data between two processes. A major advantage of this mode of transfer lies in the possibility of obtaining co-operation between two processes that are completely independent of each other, simply by changing the direction of the inputs/outputs of each of the processes, the output of one being rerouted to the input of the other. This mechanism is widely used in UNIX systems. It can be used to design simple programs, specialized in a precise task, and thereafter to bring these programs together in order to subsequently obtain more complex systems of co-operating processes, hereinafter known as coprocesses.

This type of mechanism however has a drawback. The pipes have limitations. In particular, they can connect only two processes at a time by point-to-point or unicast connections. Both processes have to be located on the same machine and, in the case of two-way communications or coprocesses, one of the processes must be the parent of the other.

SUMMARY OF THE INVENTION

It is an aim of the invention especially to overcome this drawback by eliminating the above-mentioned limitations, namely by enabling a process that uses standard inputs/outputs to communicate with several processes simultaneously, where these processes can be distributed on distinct machines and can be created independently of one another. To this end, an object of the invention is a computer system comprising at least two processes P1, P2, . . . Pi, . . . PN connected by a network. Each process is executed by a piece of hardware equipped with an operating system, and a process comprises at least:

- a library software layer by which this operating system can access the programs for the activation of the communications protocols associated with the inputs/outputs;
- an intermediate layer comprising an inter-process communications process associated with a communications channel;
- a multiplexer encapsulated in the library multiplexing the communications channel of a process Pi with the communications channels of the other processes P1, P2, . . . PN, the communications channel (21) between two processes Pi, Pk being activated by the multiplexers of the two processes, upon a request by one of them.

The main advantages of the invention are that it can be used to obtain high-level services in parallel with the inter-process communications service, simplifies applications and is simple to implement.

BRIEF DESCRIPTION OF THE DRAWINGS

Other features and advantages shall appear from the following description, made with reference to the appended drawings, of which.

MORE DETAILED DESCRIPTION

Figure 1:
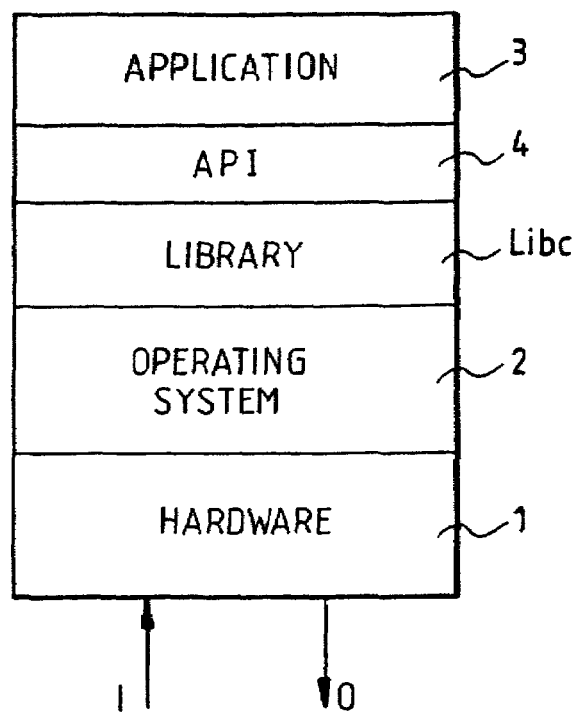
FIG. 1 shows a view of software layers implemented on a piece of hardware for the execution of a process.

FIG. 1 shows a view of the software layers implemented on a piece of hardware 1 for the execution of a computer processing operation, hereinafter also called a process, in a UNIX type system. The operating system or real-time core is a first software layer 2 that communicates directly with the piece of hardware 1. The upper layer 3 is constituted by the application. To make use of UBSS services for example data distribution or other similar types of UBSS services, the application layer 3 must make use of another software layer 4, commonly called an API which is a specific programming interface by which the data processed by the process can access the physical inputs/outputs I, O and therefore be exchanged with other processes. The software layer libc comprises a library that is used especially by the operating system 2 to access the files and the communications primitives, designed especially to activate the communications protocols associated with the different inputs/outputs I, O interfaced with the piece of hardware 1. The application layer 3 is obliged to go through the API layer 4 to access the library libc. An intermediate software layer that is not shown, known as "middleware" in the literature, comprises the UBSS type services, for example data-distribution, time-management or supervision type UBSS services. This intermediate layer is placed between the operating system 2 and the application layer 3. The application layer 3 and the API layer 4 are two software layers belonging to the user space.

Figure 2:
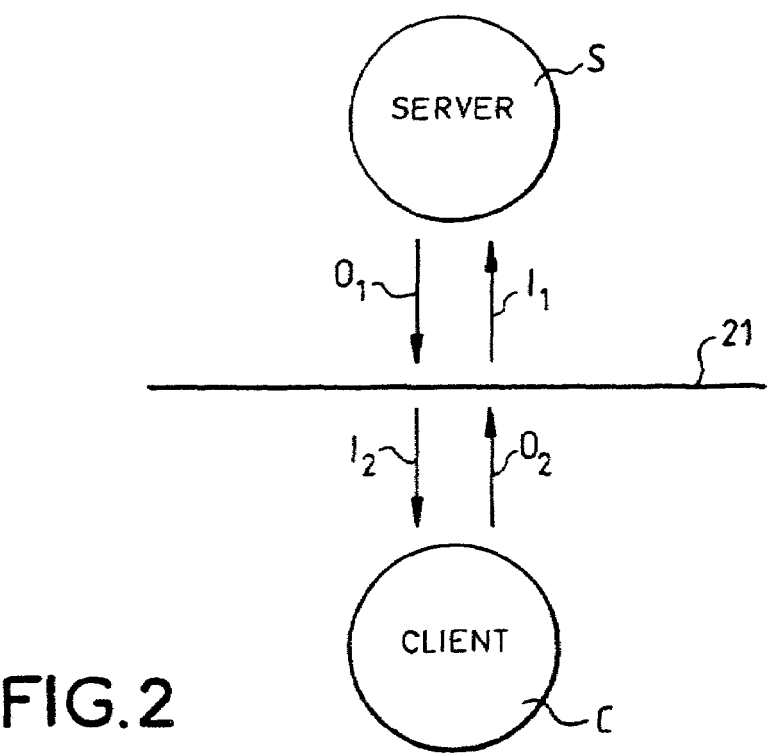
FIG. 2 shows two processes co-operating in the context of a client/server system.

FIG. 2 shows two processes that co-operate for example in the context of a client/server system. These processes use a software architecture of the type shown in FIG. 1. A first process S, for example the server, exchanges data with a communications channel or pipe 21. A second process C, for example the customer, exchanges data with this same pipe 21. The pipe 21 is actually a communications carrier associated with a service that carries out a one-way, secured data transfer between the two processes. The above-mentioned intermediate layer comprises for example this service. By bringing the direction of the inputs/outputs of each of the processes into play, in redirecting these inputs/outputs, it is possible to make these two processes co-operate independently of one another, the output $O_2$ of the server being directed to the input $I_2$ of the client, the output $O_2$ of the client being directed to the input $I_1$ of the server.

The "coprocess" mode as illustrated in FIG. 2 has limitations. In particular, the communications channel 21 can be used to connect only two processes at a time, especially because of the point-to-point connection of the inputs and outputs $I_2$, $I_2$, $O_1$, $O_2$, one API layer being associated with each of these inputs/outputs. Furthermore, these two processes must use the same machine, and especially the same piece of hardware 1 and the same operating system 2. To overcome these drawbacks, the invention enables an application to access the operating system without having to use an API and therefore without having to use a point-to-point connection of the inputs/outputs. To this end, the invention uses a program for the multiplexing of the communications channel or inter-process pipes 21.

Figure 3:
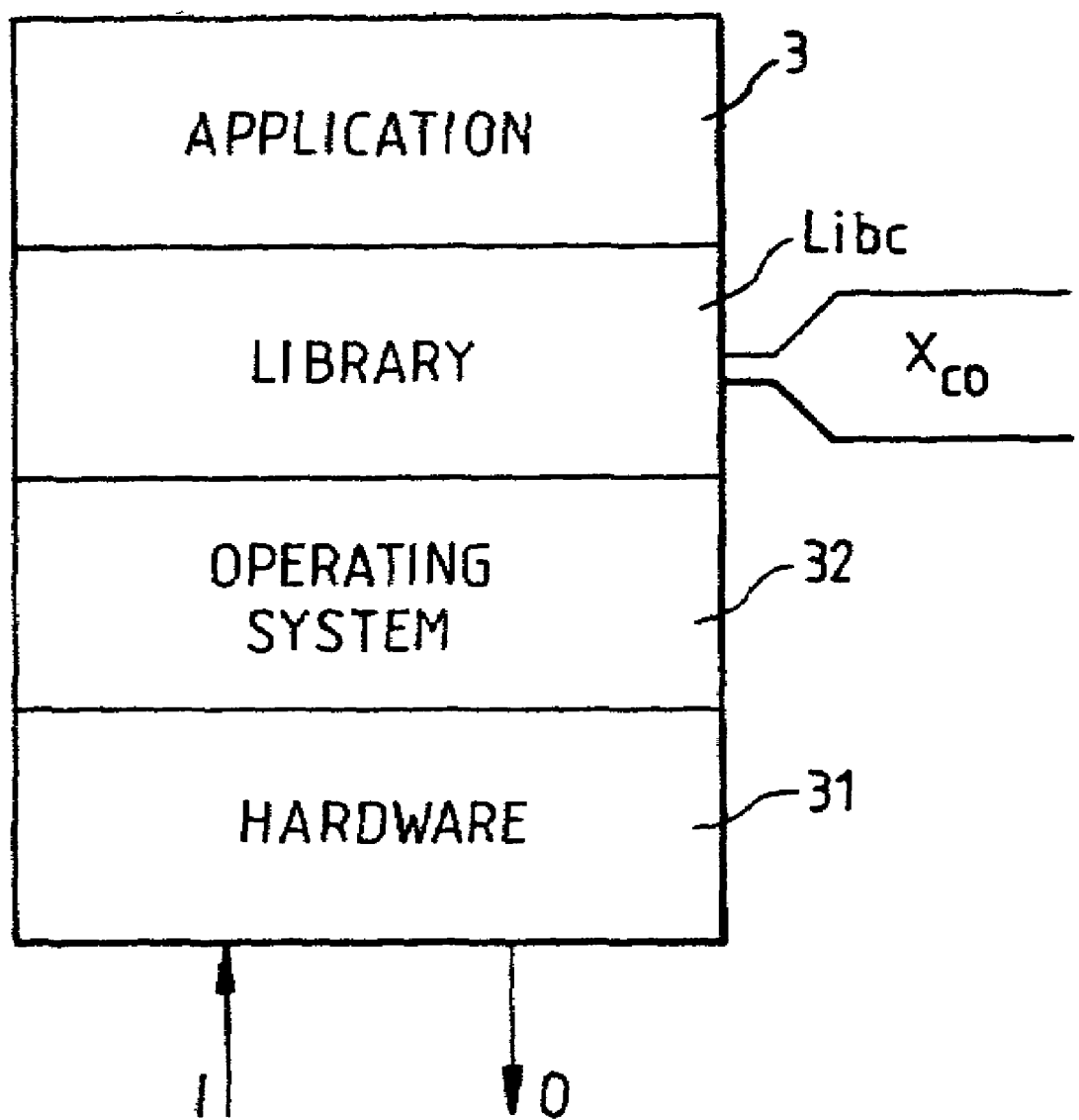
FIG. 3 is a view of software layers for the execution of a process integrated into a system according to the invention.

FIG. 3 illustrates a stacking of the layers for the execution of a process Pi working in a system according to the invention. This process is executed by a piece of hardware 31 equipped with an operating system 32. The library libc, by which the operating system accesses the programs for activating the inputs/outputs communications protocols, is still interposed between the application software layer or application 3 and the operating system. An intermediate layer comprises the communications service associated with a pipe 21. A multiplexer $X_{CO}$ is encapsulated in the library libc. It multiplexes the communications channel of the process Pi with the communications channels of the other processes P1, P2, . . . PN. More particularly, the pipe 21 between two processes Pi, Pk is activated by the multiplexers of the two processes upon the request of one of them. To illustrate this function, the multiplexing program is hereinafter also called a core process multiplexer. A core process multiplexer is encapsulated in the library libc of each process. This multiplexer can be used especially by a process to communicate simultaneously with several processes by using the standard inputs/outputs or communications ports I, O of the piece of hardware 31 of each process. It converts the file type data exchanges into a network type data exchange, in the form of data flows, for example by using the Multicast IP protocol which especially allows the simultaneous broadcasting of data and several reader processes by machine. Furthermore, the multiplexer uses, for example, the data acknowledgement mechanisms in order to preserve the secured character of the communications channel. Concurrent access to a process in read and write modes is provided by its multiplexer $X_{CO}$ which can allocate separate communication ports at the network level. Furthermore, on one and the same channel, the multiplexer can distinguish several data flows if they have been defined beforehand.

For a given process, the transparency of the multiplexer $X_{co}$ with respect to the application 3 is ensured especially by the absence of a specific API programming interface. The services of the multiplexer, especially the inter-process communications service, are implemented by the interception of calls relating to inputs and outputs according to the Multicast IP protocol. The library Libc which is the interface between the applicative level 3 and the system level 32 has a number of its functions overloaded with those of the multiplexer $X_{CO}$. However, using shared-library and dynamic link-editing techniques, the multiplexer $X_{CO}$ is added without modification of the binary files and, therefore, of the. source codes. Since the definition of the interfaces of the libraries libc is standardized, for example according to the POSIX and ANSI-ISO standards, the portability of this technique of using a multiplexer is ensured. This multiplexer $X_{CO}$ in the library libc increases the capacities of the operating system 32 non-intrusively, namely without any modification of the core. Since the infrastructure of the necessary network which is, for example, of the Multicast IP type, is also standardized and generalized, it is possible to build a heterogeneous distributed system.

Figure 4:
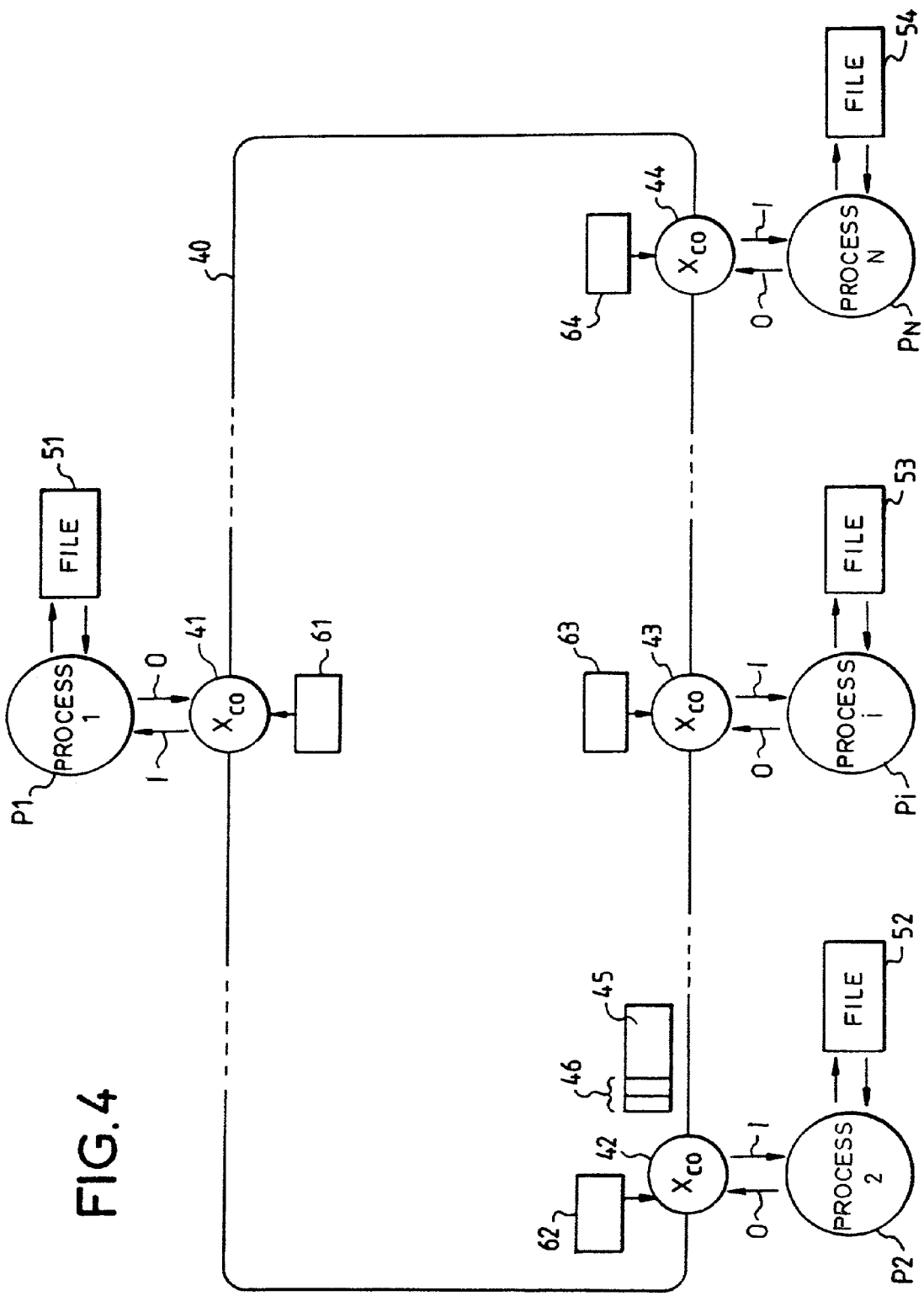
FIG. 4 is an illustration of the interfacing of processes in a system according to the invention.

FIG. 4 illustrates the interfacing of the processes in a system according to the invention. This system has n processes P1, P2, . . . Pi, . . . PN implemented on one or more machines. All these processes can be implemented, each on a different machine. These processes communicate with one another by a network 40. The data exchanges are done by a data flow exchange type of protocol, for example by using the Multicast IP protocol. Each process is considered with respect to the others as a supplier of services and/or a user of services. With each process, therefore, there is associated, for example, a class of services in a given version. These services include especially the inter-process communications services corresponding to the pipes 21. These services provide for the one-way, secured transfer of data between two processes. Each service has an associated protocol consisting of requests and responses corresponding to the inputs I and outputs O of the process. This protocol is defined in the coprocess multiplexer 41, 42, 43, 44 in a table 61, 62, 63, 64 indicating the type of data, especially whether it is request data or response data, the associated service and the prerequisite service as well as sizing attributes for the processing of data such as, for example, the size of the data blocks, the frequency or the processing time. The data processed by each process are stored in a file. Each process is therefore associated with at least one data file 51, 52, 53, 54. A file may or may not be implemented on the same machine as the process.

To exchange a block of data, for example between the process Pi and the process P2, the process Pi sends a request through its multiplexer $X_{CO}$. More particularly, the process Pi reads the data in the file 53 and then sends a data block on the network 40. This data block comprises a header 46 and the data extracted from the file 53. To make the data transit, at input or at output, on one or more communications ports of the process, the multiplexer $X_{CO}$ uses the service of the library libc to order the operating system to activate the communications protocols of these ports. The header comprises especially the address of the addressee process, in this case P2, the type of data (request or response) as well as the type of service associated with the corresponding characteristics. In the case of a data exchange, this service is the inter-process communications service of a pipe. For each process, the core process multiplexer incorporated in the library libc intercepts the calls made to the operating system 32. The multiplexers 41, 42, 43 filter the request. In particular, they use their table to interpret the type of data and the nature of the service required. The multiplexer 42 of the addressee process P2 understands that this is a data exchange of which it is the addressee. The process P2 reads for example the data 45 and then writes them, for example, in its associated file 52. A data flow 45, 56 is thus processed as a protocol, by requests and responses. A system according to the invention can thus process several data flows in parallel.

Apart from the function of inter-process communications by multiplexing of the transmission channels, which gives a virtual parallel machine in a non-intrusive manner, other high-level services can be obtained. In particular, several modes of parallel operation of the services can be implemented.

A service may be the master-slave redundancy. The first instance of the service, namely the first process of the class considered, is the master and the following instances are slaves. When a process Pi send a request on the network 40, this request is processed by all the other processes P1, P2, . . . PN, but the multiplexer 41, 42, 43, 44 of the each of these processes filters the responses from the slaves, i.e. it does not communicate these responses to the processes, this service being transparent to these processes. In the event of a loss of the master, a slave is promoted master in its turn. This hot reconfiguration algorithm in particular implements an efficient strategy of malfunction tolerance. For a mode of selective concurrent access to the processes, a system according to the invention distributes the processing load among several instances of a process. To this end, the coprocess multiplexer, at each request, selects that instance which does the processing. It makes this selection on the basis, for example, of the sequence number of the request modulo the number of concurrent entities. For non-selective concurrence, at least two instances of a process make the same request. Their responses are then returned to the client process which decides on the validity of the responses. This type of system connects two servers or more with an identical interface whose implementation is different, especially in order to overcome software malfunctions.

Several aspects of dynamic reconfiguration of the system are covered by the coprocess multiplexers. For a comprehensive functional reconfiguration, new functions defined by new classes of servers may be added to the system by the launching of new processes without requiring the stopping of the system. In the case of a local functional configuration, for a given class of service, several processes in different versions may cohabit without risk, the version of the required service being specified in the table 61, 62, 63, 64 of requests that come out of each process. In the case of a dynamic matching with the processing load, for a given class of service, in a given version, a coprocess multiplexer may activate the start of a new process in selective concurrence mode when the maximum threshold of request frequency is crossed. A hardware reconfiguration may be obtained by implementing the techniques of checkpointing. In this case, a process may have started again on another machine without interruption of the service except for the latency time due to the restarting of the process.

Another service that is enabled by the coprocessor multiplexer is the supervision process. The supervision systems generally consist of an information-collecting agent, present in the different components of the system to be supervised, and a centralized program processing the data picked up by the agents. The coprocess multiplexer may collect supervision data at the two boundaries that it faces, namely the interface with the process P1, P2, . . . PN and the interface with the transport medium. For the interface with the process, it collects especially data pertaining to the size of the requests or responses, the frequency and the time of processing by the process. For the interface with the media, it collects especially data pertaining to the latency time, namely the acknowledgement reception time and the quality of transmission, especially with regard to the number of retransmissions. For all this data, the method records the number of measurements, the minimum, maximum and mean values. For each of the values, it is possible to configure thresholds whose crossing activates an alarm or another action. The coprocess multiplexer dedicates a communications channel for the exchange of inter-process supervision data.

The coprocess multiplexer can also enable the recording and playback of data flows. The recording and playback are not directly implemented in the coprocess multiplexer but rely on some of its properties. Since all the data flows are broadcast on the Multicast IP network 40, a recorder process Pe may be inserted without any impact for the passband, capturing the messages in the files while preserving the information on spatial localization, i.e. especially the origin and the destination of the messages, and information on temporal information, namely the dating of the messages. The continuous capture of inter-process data flows Pi, Pk is not sufficient to enable the playback of the system on a given time zone. It is necessary, in addition, to be able to reposition each of the processes in the right state before the playback of the first messages. The solution may therefore lie in complementing the mechanism of the continuous capture of the transactions by a mechanism of periodic capture of the state of the processes. The capture of the state of the processes is for example implemented by a checkpoint function which herein consists firstly of the capture, in a file, of the image of the virtual memory of the process, for example by a mechanism similar to that of "core dumping", and, secondly, of the ability to restore the process from the capture file. The checkpoint function is implemented transparently in the process, by overloading the standard library, as the coprocess multiplexer is overloaded in the library libc. During the playback of a process, the system starts again from the checkpoint prior to the date of the starting of the playback, and then complements the task by replaying the transactions of the process while at the same time blocking the outputs until the starting date. Then, the transactions are played back normally during the period of the playback.

Another possible service is the modelling and validation of the protocols. By providing a local description of the inputs and outputs at the coprocess multiplexer $X_{CO}$ incorporated into each process, accompanied by certain attributes such as for example prerequisite requests or dimensioning characters such as for example the size and the processing time, it becomes possible to derive a formal comprehensive model at the systems level from this description. On this comprehensive model, it is possible to carry out checks of compatibility, the absence of the possibility of inter-blocking between processes or resource sizing. It is possible for this purpose to use, for example, a tool such as the one known as SPIN with which it is possible to carry out random simulations or make exhaustive verification of the properties of logical consistency of the system. This tool is based especially on the language PROMELA (Process Metalanguage) which is a language used to obtained an abstract modelling of asynchronous distributed systems, in the form of non-finite-state automatons and what is called LTL (linear temporal logic) that can be used to model the properties, required or undesired, of the system such as for example the random loss of a multicast IP datagram. The use of the local representation of protocols in the coprocess multiplexers $X_{CO}$ then eliminates the need to perform the difficult task of programming the formal modelling and automatically maintaining an abstract representation of the system throughout its life cycle, especially so as to be able to simulate and validate the protocols implemented by the unit processes P1, P2, . . . PN, before even having to implement them. At the strict minimum, on the online system it is possible, by a topological sorting operation on the dependency graphs of the requests, to detect potential inter-blocking between processes and therefore to avert them.

The invention advantageously simplifies the applications. Indeed, the functions related to inter-process communications, concurrence or the validation of protocol are essentially distributed. It is therefore normal to have them implemented and then activated independently of the unit applications P1, P2, PN. The result of this, therefore, is a major simplification of the designing of the applications that may get focused on the performance of a single or elementary task, these tasks interfacing at the standard inputs and outputs. A special effort it is required with respect to the description of the input/outputs in the coprocess multiplexer. This effort is in any case beneficial since it formalizes the interface, thus facilitating the reutilization of a module for an elementary task. Since a module has a batch-type processing, namely a reading of its data at input from a file 51, 52, 53, 54, it automatically goes into a reactive mode by the action of the coprocess multiplexer. The need to introduce asynchronism into the application disappears, especially because of the distribution of the services in concurrent processes and the asynchronism already present in the coprocess multiplexer.

Another advantage provided by the invention relates to the strategy of reutilization. In the conventional object-oriented development, the code reutilization is obtained by abstraction of the algorithms and then by instantiation in object form. This methodology of development implies a complete novel conception of the pre-existing code. This model may become inefficient when the algorithm is dispersed in a complex hierarchy of classes and sub-classes, making it difficult for a class to be understood without knowledge of the details of the entire hierarchy. On the contrary, the coprocess multiplexer and more generally the addition of services transparently with respect to the system interfaces promotes reutilization by the concretization of the algorithms and by the capacity of integration of a process into the system. It is not so much that the code is reutilized as that the executable is directly used. In principle, it is not necessary to return to the existing code or else there may be a return to the code in order to simplify it but not to design it. The legacy of services arises not statically when the programs are compiled but dynamically when the programs are executed. The inter-module interface is defined in terms of protocols rather than in terms of the data structures and methods. The object-oriented programming is designed especially to master the complexity within an application, namely to create big applications out of small sets of services while the coprocess multiplexer, as used in the invention, gives mastery over the complexity of a distributed system, i.e. it enables the creation of major concurrent systems from small processes.

In general, the data flow or text flow type protocols, processed line by line, are easy to understand. They provide for a simple and readable definition of the commands. This permits the direct implementation of the isolated program in interactive mode at a terminal. A user benefits from an extensive battery of powerful text-handling tools to automate the tests or the simulation of data. At the systems level, the advantages are even more marked. In particular, the text format provides for an immediate interpretation of the capture of inter-process data flows Pi, Pk. The representation of the data in ASCII code ensures data exchange between heterogeneous software architecture platforms. The use of a protocol in text mode also averts the need to encumber the code with finalizing traces related to the exchanges. Finally, in time, the text mode by its open-ended nature and flexibility facilitates upward compatibility between successive versions of a protocols.

What is claimed is:

1. A computer system comprising at least two processes P1, P2, . . . Pi, . . . PN connected by a network, wherein each process is executed by a piece of hardware equipped with an operating system, wherein a process comprises:
 a library software layer used by the operating system to access a program for activation of a communications protocol associated with an input/output of the hardware;
 an intermediate software layer comprising an inter-process communications process associated with a communications channel; and
 a multiplexer encapsulated in the library software layer and configured to multiplex a communication channel of a process Pi with communication channels of the other processes P1, P2, . . . PN, data exchanges between processes being made in a form of data flows, a communication channel between two processes Pi, Pk being activated by the multiplexers of the two processes Pi, Pk, upon a request to activate the communication channel between the two processes Pi, Pk transmitted by one of the two processes Pi, Pk.

2. The system according to claim 1, wherein the library software layer is interposed between an applications software layer and the operating system.

3. The system according to claim 1 or 2, wherein a communication channel carries out a one-way transfer of data between two processes.

4. The system according to claim 1 or 2, wherein an inter-process communications service is activated by the multiplexer intercepting calls pertaining to inputs/outputs of the hardware according to a protocol made up of requests and responses, this protocol being defined at a level of the multiplexer in a table indicating a type of data, wherein data exchanges are made in a form of data flows.

5. The system according to claim 4 wherein, in addition to the inter-process communications service, other services activated by the multiplexer are associated with the process, the services being activated according to a protocol consisting of requests and responses.

6. The system according to claim 4, wherein the table indicates whether the data is a request or a response, an associated service, and sizing attributes for data processing.

7. The system according to claim 6, wherein, when a service is a master-slave redundancy, a first instance of the slave being a master and the following instances being slaves, a process Pi sends out a request, this request is processed by all other processes P1, P2, . . . PN, the multiplexer of these processes filtering the responses of the slaves, and in the event of a loss of a master, a slave is promoted to master in its turn.

8. The system according to claim 7, wherein, in a selective concurrent mode of access to a process, to enable a distribution of a processing load among several instances of the process, the multiplexer of the process is configured to make a selection, at each request, of the instance that carries out the processing.

9. The system according to claim 8, wherein, in a mode of non-selective concurrent access to a process, at least two instances of a process make a same request, their responses being returned to a client process which decides on a validity of a response.

10. The system according to claim 9, wherein the multiplexer collects supervision data at two boundaries that it faces, an interface with the process P1, P2, . . . PN and an interface with the transport medium for all these data, the process recording a number of measurements, a minimum, maximum and mean values, for each of these values, thresholds being configured, a crossing of these thresholds being used to activate an alarm or to carry out another action.

11. The system according to claim 10, wherein, for the interface with the process, the multiplexer collects data pertaining to a size of the requests or responses, a frequency and a processing time taken by the process, and for an interface with the transport medium, the multiplexer collects data pertaining to a latency time and to a quality of transmission.

* * * * *